United States Patent
Song et al.

(10) Patent No.: US 11,354,856 B2
(45) Date of Patent: Jun. 7, 2022

(54) UNMANNED AERIAL VEHICLE NAVIGATION MAP CONSTRUCTION SYSTEM AND METHOD BASED ON THREE-DIMENSIONAL IMAGE RECONSTRUCTION TECHNOLOGY

(71) Applicant: Star Institute of Intelligent Systems, Chongqing (CN)

(72) Inventors: Yongduan Song, Chongqing (CN); Xiao Cao, Chongqing (CN)

(73) Assignee: Star Institute of Intelligent Systems, Chongqing (CN)

( * ) Notice: Subject to any disclaimer, the term of this patent is extended or adjusted under 35 U.S.C. 154(b) by 0 days.

(21) Appl. No.: 17/196,298

(22) Filed: Mar. 9, 2021

(65) Prior Publication Data
US 2021/0358206 A1    Nov. 18, 2021

(30) Foreign Application Priority Data
May 14, 2020 (CN) .......................... 202010410011.2

(51) Int. Cl.
*G06T 17/05* (2011.01)
*G01C 21/00* (2006.01)
*G06T 7/50* (2017.01)

(52) U.S. Cl.
CPC ............ *G06T 17/05* (2013.01); *G01C 21/005* (2013.01); *G01C 21/3804* (2020.08); *G06T 7/50* (2017.01); *G06T 2210/61* (2013.01)

(58) Field of Classification Search
CPC ..... G06T 17/00; G06T 17/05; G06T 2210/61; G06T 7/50; G01C 21/005; G01C 21/3804; G01C 23/00; Y02T 10/40; G05D 1/102
See application file for complete search history.

(56) References Cited

U.S. PATENT DOCUMENTS

| | | | |
|---|---|---|---|
| 9,466,143 B1 * | 10/2016 | Walvoord | G06T 15/00 |
| 2016/0068267 A1 * | 3/2016 | Liu | G05D 1/0088 |
| | | | 701/11 |
| 2020/0066034 A1 * | 2/2020 | Tham | G06T 7/80 |

* cited by examiner

*Primary Examiner* — Daniel F Hajnik
(74) *Attorney, Agent, or Firm* — Novick, Kim & Lee, PLLC; Zhi Yang Xue; Jihun Kim

(57) ABSTRACT

An unmanned aerial vehicle navigation map construction system based on three-dimensional image reconstruction technology comprises an unmanned aerial vehicle, a data acquiring component and a three-dimensional navigation map construction system, wherein the three-dimensional navigation map construction system comprises an image set input system, a feature point extraction system, a sparse three-dimensional point cloud reconstruction system, a dense three-dimensional point cloud reconstruction system, a point cloud model optimization system and a three-dimensional navigation map reconstruction system. A scene image set is input into the three-dimensional navigation map construction system, feature point detection is carried out on all images, a sparse point cloud model of the scene and a dense point cloud model of the scene are reconstructed, the model is optimized by removing a miscellaneous point and reconstructing the surface, and a three-dimensional navigation map of the scene is reconstructed.

13 Claims, 6 Drawing Sheets

UNMANNED AERIAL VEHICLE NAVIGATION MAP CONSTRUCTION SYSTEM AND METHOD BASED ON THREE-DIMENSIONAL IMAGE RECONSTRUCTION TECHNOLOGY

TECHNICAL FIELD

The present disclosure relates to the technical field of three-dimensional reconstruction, in particular to an unmanned aerial vehicle navigation map construction system and method based on three-dimensional image reconstruction technology.

BACKGROUND

Vision is the most important way for human beings to perceive their surroundings. It is a very popular research direction in the field of computer vision to make computers have the ability to perceive three-dimensional environment like human beings. With the rapid development of information technology, three-dimensional models are needed in many fields such as virtual reality, movie special effects, intelligent driving, robot navigation, geographic map, history and culture, medicine and so on. For example, high-precision maps in automatic driving are a prerequisite for automatic driving. In the early stage, urban road-related data is collected in a large scale to reconstruct high-precision maps through three dimensions. Mobile robots use three-dimensional occupation maps for navigation, such as obstacle avoidance and route planning. In the field of geography and measuring, three-dimensional terrain is constructed by using three-dimensional reconstruction technology for specific geographical areas. In the field of history and culture, three-dimensional reconstruction technology is used to model historical relics and ancient buildings. In the future, with the rapid development of artificial intelligence, robotics and other fields, the demand for three-dimensional reconstruction in various fields of society will increase rapidly.

People perceive and acquire three-dimensional objects through the special biological structure of human eyes, but it is a difficult problem for computers to acquire three-dimensional objects. Traditional methods of obtaining three-dimensional models are based on geometric modeling and laser scanning, but they all have obvious shortcomings. Geometric modeling requires direct contact with the geometric shape of the object to be measured to construct a three-dimensional model of the object, and requires special software tools and professional personnel, which is heavy and time-consuming. Laser scanning is the three-dimensional scanner today. Although the precision of scanning reconstruction is very high, the device is relatively expensive and difficult to carry.

In recent years, the method of constructing a three-dimensional model based on image information has become a hot research. The three-dimensional reconstruction method based on an image sequence firstly extracts and matches the feature points of the image, then uses the motion from structure (SFM) method to recover the depth of the feature points to obtain sparse three-dimensional point cloud, then uses multi-view stereo (MVS) technology to obtain dense point cloud of the scene, and finally carries out the steps of point cloud miscellaneous point cleaning and surface reconstruction to obtain a complete three-dimensional model. Compared with geometric modeling and laser scanning, it is more convenient to acquire images, and acquiring device is cheaper. Only ordinary cameras or mobile phones are needed to take pictures, which greatly reduces the difficulty and cost of three-dimensional reconstruction. Moreover, three-dimensional reconstruction based on images has a very good effect, and the accuracy of reconstruction can even be close to laser scanning. The general three-dimensional reconstruction process comprises many different steps such as feature point extraction, sparse point cloud reconstruction, and dense point cloud reconstruction. In the existing algorithm of the sparse point cloud reconstruction step, all images are often matched pairwise. In many cases, some images have no common parts, so they need no matching. Therefore, it takes a lot of time in this step.

The common algorithm for feature point extraction is SIFT algorithm. The SIFT algorithm mainly comprises two steps, in which one step is to extract feature points from the image, and the other step is to extract feature vectors of feature points. Its features have good invariance to brightness, and also have good stability to visual angle change, affine transformation, noise and so on. There is SURF algorithm, which is improved on the basis of SIFT algorithm and accelerates the speed of feature point detection. There is also ORB algorithm, which adopts a very fast feature point detection method and a feature vector occupying very little memory, so the algorithm speed is faster than SURF. SFM is the most popular method at present in the field of sparse three-dimensional point cloud reconstruction. The early methods of SFM are mainly incremental methods, the most famous of which is Bundler system. Secondly, VisualSFM three-dimensional reconstruction software is also based on an incremental system, and the three-dimensional model of objects or scenes can be obtained by inputting image sets. The non-incremental method, also referred to as global SFM, mainly comprises openMVG three-dimensional reconstruction system. The incremental method has high time efficiency, but it has the disadvantage of error accumulation. The non-incremental method considers the relationship between all images, so it can eliminate the accumulation of errors. MVS is the most popular method in dense three-dimensional reconstruction. MVS is usually based on SFM, and uses the sparse point cloud and the camera position output by SFM to reconstruct dense point cloud. The MVS algorithm is mainly divided into the following categories. The first category is based on voxels and reconstructs models from voxel surfaces. The second category obtains the model by minimizing the cost function by iterating the curved surface. The third category extracts models from a series of depth maps based on consistency constraints. The fourth category is the method based on image feature points, which is also the most popular method at present. There are also open source libraries such as openMVS in this field.

Unmanned aerial vehicle (UAV) refers to an unmanned air vehicle. Its related technologies are developing at a high speed, attracting the attention of many scientific researchers. At present, a civil multi-rotor unmanned aerial vehicle is mainly used for aerial photography, agricultural plant protection, unmanned express delivery and many other fields. A multi-rotor unmanned aerial vehicle is a special unmanned aerial vehicle with three or more rotor shafts, which is driven by the motor on each shaft to drive the rotor, so as to generate lift. By changing the relative relationship between different rotors in a quadrotor unmanned aerial vehicle, various flights can be realized. They are mainly applicable to low-altitude and low-speed missions that require vertical take-off, landing and hovering. Before the introduction of small multi-rotor unmanned aerial vehicles, the traditional image data acquiring methods comprise manual acquisition, satellite acquisition and large aircraft acquisition, but the traditional methods have various shortcomings and limitations. When faced with small scenes or objects, it is easy for human to acquire images, but when faced with large or complex scenes, it is usually difficult for human to reach. Satellites have advantages in collecting geographic and topographic data in two-dimensional maps. However, under the influence of weather, such as in the case of cloud and fog, the details of acquired images will be lost, and the shooting angle of satellites is insufficient. Therefore, clearer images and more angles are needed to construct three-dimensional models of scenes. Large aircrafts with high-definition cameras are more flexible than satellites, but their flight costs are higher. They need to take off and land at airports and apply for routes, and their flight speed is very fast. The unmanned aerial vehicle acquires image data by aerial photography, which has many advantages, such as unlimited location, wide field of vision, stable shooting and so on. It is convenient to take off and land, and the cost of the unmanned aerial vehicle is not high. Therefore, it brings a more convenient and efficient way to acquire image data in the field of three-dimensional reconstruction.

In many fields and scenes, it is necessary to apply the autonomous flight function of the unmanned aerial vehicle, such as agricultural plant protection, aerial power grid detection, tunnel cable detection, unmanned aerial vehicle transportation, mission search and rescue, etc. In order to complete these tasks well, the unmanned aerial vehicle needs the help of navigation information. Under normal circumstances, the unmanned aerial vehicle can use GPS information, but it needs other forms of navigation information when GPS signal is lacking or poor. Navigation needs to model the flight scene of the unmanned aerial vehicle. Classic three-dimensional spatial map models comprise raster maps, geometric maps, topological maps and point cloud maps. However, these classic map models are not suitable for actual navigation, so that a three-dimensional spatial map based on octree is proposed, which combines raster maps and point cloud maps, and can effectively represent spatial scene information. Its storage space is compressed to reduce memory consumption. In actual navigation, the value of each raster is queried to know whether it can pass, and the resolution can be adjusted according to different environmental requirements. Generally speaking, it is difficult to obtain a high-precision three-dimensional spatial map which can be used for navigation, so that it is necessary to find a convenient way to obtain a three-dimensional navigation map of the scene. The three-dimensional navigation map of the scene can provide important auxiliary information for navigation of an unmanned aerial vehicle tasks such as path planning or obstacle avoidance, but there is no such method to obtain the three-dimensional navigation map of the scene at present, so it needs to be overcome.

SUMMARY

In view of the above problems existing in the prior art, the first technical problem to be solved by the present disclosure is: how to conveniently obtain a scene three-dimensional navigation map of an unmanned aerial vehicle, which specifically comprises an unmanned aerial vehicle navigation map construction system based on three-dimensional image reconstruction technology, comprising an unmanned aerial vehicle, a data acquiring component and a three-dimensional navigation map construction system; wherein the data acquiring component is provided on the unmanned aerial vehicle, the data acquiring component is a camera; the camera is used for acquiring a scene image set; the three-dimensional navigation map construction system comprises an image set input system, a feature point extraction system, a sparse three-dimensional point cloud reconstruction system, a dense three-dimensional point cloud reconstruction system, a point cloud model optimization system and a three-dimensional navigation map reconstruction system; the image set input system is a process of inputting the scene image set into the three-dimensional navigation map construction system, the feature point extraction system is a process of detecting feature points of all images, the sparse three-dimensional point cloud reconstruction system is a process of reconstructing a sparse point cloud model of a scene, the dense three-dimensional point cloud reconstruction system is a process of reconstructing a dense point cloud model of a scene, the point cloud model optimization system is an optimization process of removing a miscellaneous point and reconstructing the surface of the model, and the three-dimensional navigation map reconstruction system is a process of reconstructing a three-dimensional navigation map of a scene, and finally applying the obtained three-dimensional navigation map to an unmanned aerial vehicle as navigation of unmanned aerial vehicles for providing auxiliary information.

The present disclosure further discloses an unmanned aerial vehicle navigation map construction method based on three-dimensional image reconstruction technology, specifically comprising the steps of:

S1, constructing a three-dimensional navigation map for a scene image set acquired by a data acquiring component;

S2, inputting the acquired scene image set into a three-dimensional navigation map construction system, sequentially carrying out feature point extraction, sparse three-dimensional point cloud reconstruction, dense three-dimensional point cloud reconstruction, point cloud model optimization and three-dimensional navigation map reconstruction in the three-dimensional navigation map construction system, and finally obtaining a three-dimensional navigation map of the scene as navigation of unmanned aerial vehicles for providing auxiliary information.

Preferably, the specific method of constructing a three-dimensional navigation map for a scene image set acquired by a data acquiring component in step S1 is to use the unmanned aerial vehicle loaded with a data acquiring component to carry out aerial photography of the target scene, and collect the image data set of the scene from different positions and angles; the specific method of step S2 is as follows:

S2-1: inputting an image set: inputting the acquired scene image data set into a three-dimensional navigation map construction system, opening the folder where the image data set is located in the three-dimensional navigation map construction system, and then selecting and loading all images;

S2-2: extracting feature points: extracting image feature points one by one for all images, detecting its position and calculating its feature vector, and saving the feature point information of each image as a file for use in subsequent steps;

S2-3: reconstructing sparse three-dimensional point cloud: carrying out inter-image feature matching on the feature point information obtained in step S2-2, first calculating the camera position of each image, then carrying out selective inter-image matching according to the camera position, eliminating the mismatching after the inter-image feature point matching, then calculating the basic matrix and essential matrix by using the constraint on epipolar geometry in double views, then performing singular value decomposition on the essential matrix to obtain the information of image rotation and translation, then restoring the three-dimensional coordinates of feature points by triangulation technology, then optimizing all feature points and image rotation and translation by bundling optimization, and finally obtaining the sparse three-dimensional point cloud model of the scene;

S2-4: reconstructing dense three-dimensional point cloud: carrying out dense reconstruction on the sparse point cloud obtained in step S2-3, expanding the sparse point cloud to all pixel points of the image so that there will be epipolar geometric constraints on the same part in multiple view images, on the premise of epipolar geometry constraints, searching for and judging pixel by pixel on the epipolar lines in the corresponding images, finding corresponding points, searching for corresponding points in all images, and then expanding and reconstructing dense three-dimensional point cloud;

S2-5: optimizing a point cloud model: optimizing the point cloud model on the dense point cloud obtained in step S2-4, first deleting the miscellaneous points in the model, and then reconstructing its surface to improve the model;

S2-6: reconstructing a three-dimensional navigation map: constructing a three-dimensional navigation map based on the optimized model obtained in step S2-5, inputting a point cloud model, then taking the whole space as a root node, dividing the space down continuously until reaching the required resolution; for the leaf space with some points, defining its value as 1, indicating that it is occupied; and for the leaf space without points, defining its value as 0, indicating that it is empty, and finally obtaining a three-dimensional navigation map.

The above technical features have the functions of collecting image data sets of scenes from different positions and angles, then extracting image feature points one by one for all images in the process of extracting feature points, detecting the position of each feature point and calculating its feature vector, saving the feature point information of each image into a file, and in addition, carrying out inter-image feature matching on the obtained feature point information, first calculating the camera position of each image, then carrying out selective inter-image matching according to the camera position, eliminating the mismatching after the inter-image feature point matching, then calculating the basic matrix and essential matrix by using the constraint on epipolar geometry in double views, then performing singular value decomposition on the essential matrix to obtain the information of image rotation and translation, then restoring the three-dimensional coordinates of feature points by triangulation technology, then optimizing all feature points and image rotation and translation by bundling optimization, finally obtaining the sparse three-dimensional point cloud model of the optimized scene, optimizing by the point cloud model, and finally obtaining a clear three-dimensional navigation map, so as to achieve higher accuracy and higher precision of the finally constructed navigation map.

Preferably, the method of carrying out selective inter-image matching in step S2-3 is as follows: first selecting a first image to be initialized as (0,0,0), then calculating the camera position for the subsequent images from the reference image, and in the process of matching between reconstructed images, for each image, taking the distance between the images with the nearest distance as the unit radius R, and setting a scale coefficient K to match only other images whose distance from this image is less than KR. Refer to FIG. 3 for the flow chart of selective inter-image matching. The function of this technical feature is to make the matching effect better and closer to reality in the process of image matching, and finally ensure high accuracy.

Preferably, the step of calculating the camera position corresponding to the image is as follows:

i) extracting feature points from all images, selecting the first image as a reference image, and initializing it as (0,0,0);

ii) starting from the reference image, carrying out the feature point matching between the following image and the current image, calculating the camera position parameters, i.e. the rotation matrix and the translation vector, according to the constraint on epipolar geometry in double views; giving a matrix F, which represents the basic matrix of the relationship between two image cameras, in which given two matching points $x_1$ and $x_2$, the two matching points have the relationship as shown in the following formula (1);

$$x_1^T F x_2 \tag{1}$$

where: T represents the transposition of a vector, and the degree of freedom of matrix F is 7, so that matrix F is calculated by an eight-point method;

then calculating a given matrix E, which represents the essential matrix of the relationship between two image cameras, in which the essential matrix can be obtained as shown in the following formula (2);

$$F = k'^{-T} E k^{-1} \tag{2}$$

where K and K' are the internal parameter matrices of two cameras, respectively, the essential matrix E consists of a rotation matrix R and a translation vector t, and as shown in the following formula (3), E can be subjected to singular value decomposition to obtain R and t;

$$E = t \hat{} R \tag{3}$$

iii) taking the subsequent image as the current image, and repeating step ii until all the image camera positions are obtained.

According to the method, feature points are acquired for all acquired images, so that the authenticity of the finally acquired images is higher, and the accuracy of the final images is further ensured.

Preferably, when each image is matched with other images, an image closest to the camera position of the image is found, and during the inter-image matching when the distance therebetween is set as the unit radius R, a scale coefficient K is given, only other images whose camera position satisfies formula (4) are matched:

$$H_{ij} < KR \tag{4}$$

where $H_{ij}$ represents the camera position distance between the ith image and the jth image.

The above method can reduce many unnecessary inter-image matching, finally improve the matching degree, and finally reduce many unnecessary inter-image matching and time consumption.

Preferably, the three-dimensional navigation map in step S2-6 is based on an octree data structure, which refers to a tree data structure with eight sub-nodes, the space is divided into eight sub-spaces after being divided for three times, that is to say, left and right, up and down, front and back, the original three-dimensional point cloud model space is divided into octrees, the space without point cloud is not divided, and all the nodes of the leaf nodes with point cloud are pruned, finally, the three-dimensional navigation map with octree as the storage structure is obtained, the resolution is adjustable, and finally, the process of constructing a three-dimensional point cloud model into a three-dimensional navigation map is realized. The above method can obtain image information from different spaces and angles to improve the accuracy of image construction.

Preferably, the step of constructing a three-dimensional point cloud model as a three-dimensional navigation map is as follows:

a) loading a three-dimensional point cloud model, determining the resolution of a three-dimensional navigation map, creating an octree object, and inserting the point cloud into the tree;

b) initializing the point cloud space as the root node, and determining the recursive depth according to the resolution;

c) dividing the current space node into eight subspace nodes, and not dividing if there is no point cloud in the current space;

d) judging whether to continue the division, if not, continuing the previous step c, if so, stopping the division, pruning all the nodes of the leaf nodes with point cloud, and obtaining the final three-dimensional navigation map. The above method further shows how to construct a three-dimensional navigation map by using the three-dimensional point cloud model, and the whole process is simple and convenient to operate.

Compared with the prior art, the present disclosure has at least the following advantages.

1. The unmanned aerial vehicle navigation map construction method based on three-dimensional image reconstruction technology of the present disclosure can collect the image set of the target scene by aerial photography, reconstruct the three-dimensional navigation map of the scene well, and provide important auxiliary information for navigation of unmanned aerial vehicles.

2. Images are acquired using aerial photography of unmanned aerial vehicles, which can collect stable and continuous scene image data sets.

3. Using selective inter-image matching strategy can effectively reduce the time consumption of unnecessary inter-image matching in the three-dimensional navigation map construction system, and the overall reconstruction speed is faster.

4. The image data set of the scene is collected, then the three-dimensional point cloud is reconstructed, and the three-dimensional navigation map of the scene is finally constructed based on the three-dimensional point cloud. This method is very convenient, and the obtained map has high accuracy.

In the figures, 1—unmanned aerial vehicle, 2—data acquiring component; 3—three-dimensional navigation map construction system; 4—image set input system; 5—feature point extraction system; 6—sparse three-dimensional point cloud reconstruction system; 7—dense three-dimensional point cloud reconstruction system; 8—point cloud model optimization system; 9—three-dimensional navigation map reconstruction system.

DETAILED DESCRIPTION

The present disclosure will be described in further detail below.

Embodiment 1

Figure 1:
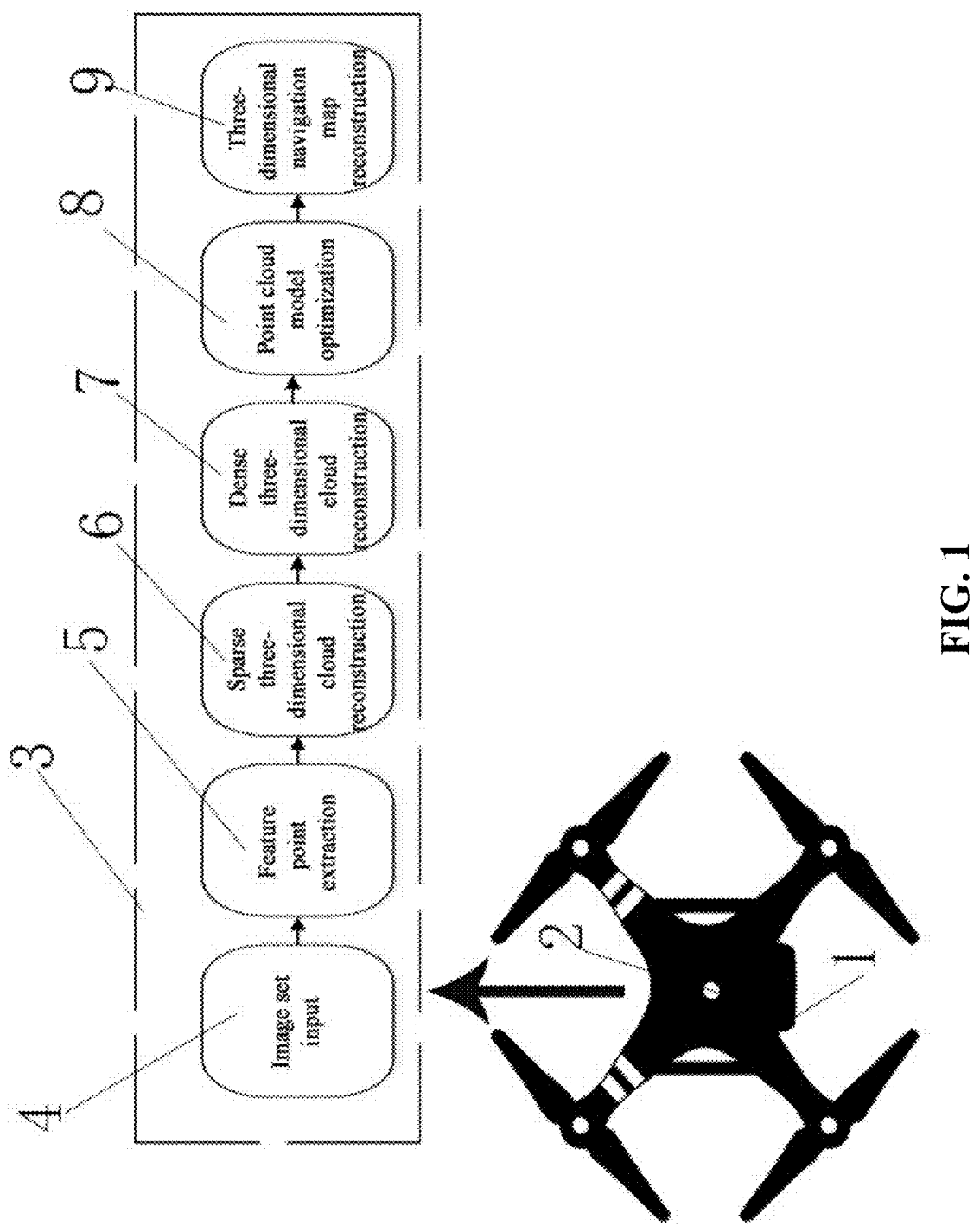
FIG. 1 is a connection schematic diagram of an unmanned aerial vehicle navigation map construction system based on three-dimensional image reconstruction technology.
Figure 2:
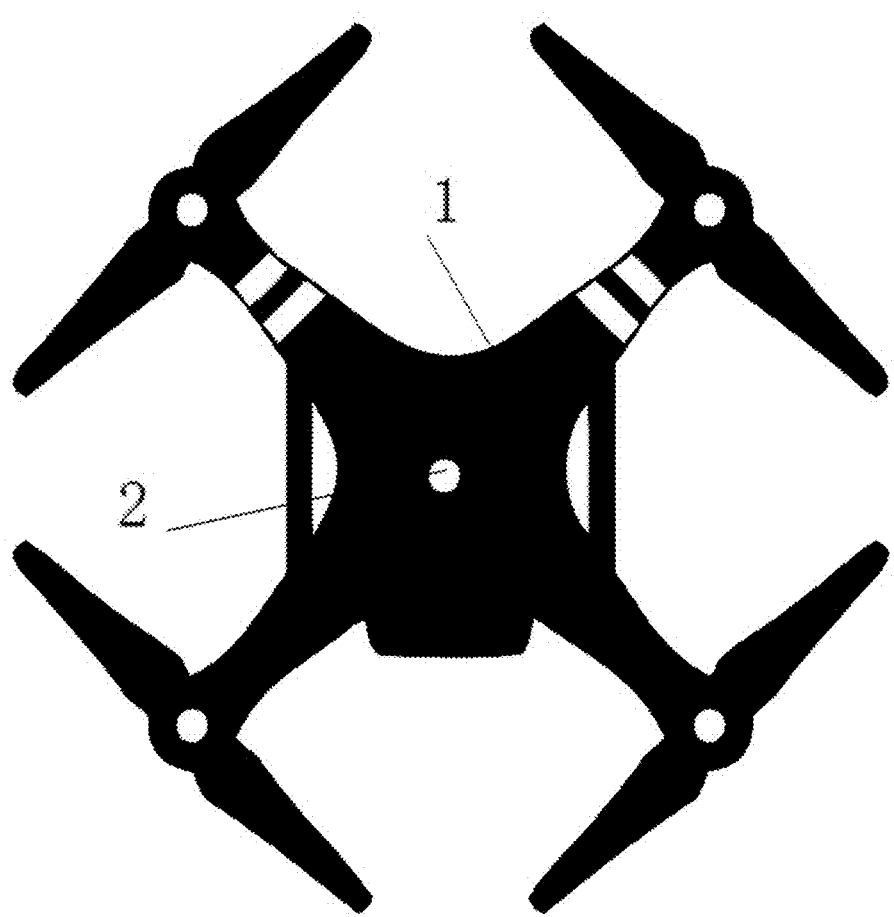
FIG. 2 is a schematic diagram of an unmanned aerial vehicle.

Referring to FIG. 1 and FIG. 2, this embodiment discloses an unmanned aerial vehicle navigation map construction system based on three-dimensional image reconstruction technology, comprising an unmanned aerial vehicle 1, a data acquiring component 2 and a three-dimensional navigation map construction system 3; wherein the data acquiring component 2 is provided on the unmanned aerial vehicle 1, the data acquiring component 2 is a camera; the camera is used for acquiring a scene image set; the three-dimensional navigation map construction system 3 comprises an image set input system 4, a feature point extraction system 5, a sparse three-dimensional point cloud reconstruction system 6, a dense three-dimensional point cloud reconstruction system 7, a point cloud model optimization system 8 and a three-dimensional navigation map reconstruction system 9; the image set input system 4 is a process of inputting the scene image set into the three-dimensional navigation map construction system, the feature point extraction system 5 is a process of detecting feature points of all images, the sparse three-dimensional point cloud reconstruction system 6 is a process of reconstructing a sparse point cloud model of a scene, the dense three-dimensional point cloud reconstruction system 7 is a process of reconstructing a dense point cloud model of a scene, the point cloud model optimization system 8 is an optimization process of removing a miscellaneous point and reconstructing the surface of the model, and the three-dimensional navigation map reconstruction system 9 is a process of reconstructing a three-dimensional navigation map of a scene, and finally applying the obtained three-dimensional navigation map to an unmanned aerial vehicle 1 as navigation of unmanned aerial vehicles 1 for providing auxiliary information.

The unmanned aerial vehicle 1 in this embodiment is a multi-rotor unmanned aerial vehicle 1, and the multi-rotor unmanned aerial vehicle 1 consists of a frame, a motor, a rotor, a flight control, a data acquiring component 2, and a memory. The data acquiring component 2 is the camera responsible for shooting images, and the video images shot by the camera are first stored in the memory of the unmanned aerial vehicle 1. The specific appearance of the unmanned aerial vehicle 1 is shown in FIG. 2.

Figure 3:
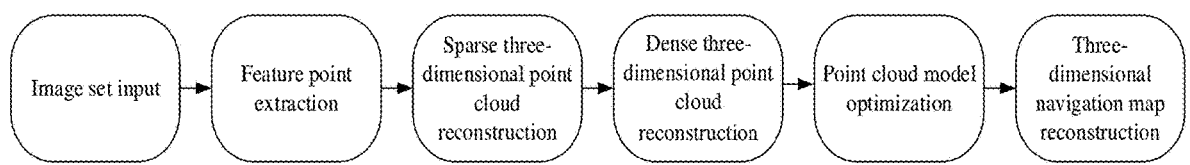
FIG. 3 is a flow chart of a three-dimensional navigation map construction system.
Figure 4:
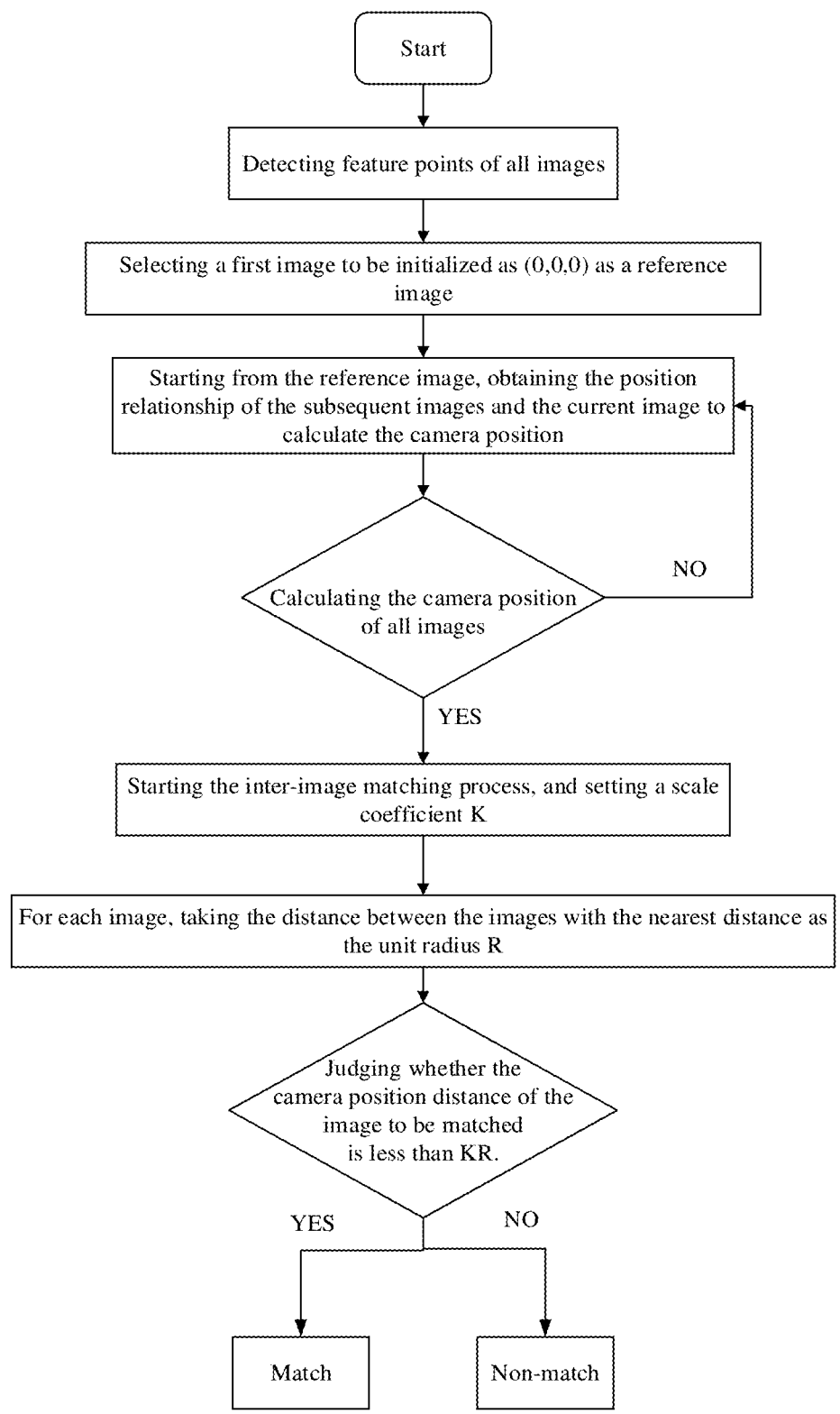
FIG. 4 is a process diagram of selective inter-image matching.

The three-dimensional navigation map construction system in this embodiment comprises several flow steps, such as image set input, feature point extraction, sparse three-dimensional point cloud reconstruction, dense three-dimensional point cloud reconstruction, point cloud model optimization, and three-dimensional navigation map reconstruction. The flow chart is shown in FIG. 3.

Working principle: the scene image set is acquired through the camera on an unmanned aerial vehicle 1, then the scene image set is input into the three-dimensional navigation map construction system, feature point detection process is carried out on all images, then the sparse point cloud model of the scene is reconstructed, then the dense point cloud model of the scene is reconstructed, the model is optimized by removing a miscellaneous point and reconstructing the surface, finally the three-dimensional navigation map of the scene is reconstructed, and then the obtained three-dimensional navigation map is applied to an unmanned aerial vehicle 1 as navigation of unmanned aerial vehicles 1 for providing auxiliary information.

This embodiment has the following advantages.

1. The unmanned aerial vehicle navigation map construction method based on three-dimensional image reconstruction technology of the present disclosure can collect the image set of the target scene by aerial photography, reconstruct the three-dimensional navigation map of the scene well, and provide important auxiliary information for navigation of unmanned aerial vehicles 1.

2. Images are acquired using aerial photography of unmanned aerial vehicles 1, which can collect stable and continuous scene image data sets.

3. Using selective inter-image matching strategy can effectively reduce the time consumption of unnecessary inter-image matching in the three-dimensional navigation map construction system, and the overall reconstruction speed is faster.

4. The image data set of the scene is collected, then the three-dimensional point cloud is reconstructed, and the three-dimensional navigation map of the scene is finally constructed based on the three-dimensional point cloud. This method is very convenient, and the obtained map has high accuracy.

Embodiment 2

As shown in FIG. 3-7, this embodiment discloses an unmanned aerial vehicle navigation map construction method based on three-dimensional image reconstruction technology, specifically comprising the steps of:

S1, constructing a three-dimensional navigation map for a scene image set acquired by a data acquiring component 2;

S2, inputting the acquired scene image set into a three-dimensional navigation map construction system, sequentially carrying out feature point extraction, sparse three-dimensional point cloud reconstruction, dense three-dimensional point cloud reconstruction, point cloud model optimization and three-dimensional navigation map reconstruction in the three-dimensional navigation map construction system, and finally obtaining a three-dimensional navigation map of the scene as navigation of unmanned aerial vehicles 1 for providing auxiliary information.

Preferably, the specific method of constructing a three-dimensional navigation map for a scene image set acquired by a data acquiring component 2 in step S1 is to use the unmanned aerial vehicle 1 loaded with a data acquiring component 2 to carry out aerial photography of the target scene, and collect the image data set of the scene from different positions and angles; the specific method of step S2 is as follows:

S2-1: inputting an image set: inputting the acquired scene image data set into a three-dimensional navigation map construction system, opening the folder where the image data set is located in the three-dimensional navigation map construction system, and then selecting and loading all images;

S2-2: extracting feature points: extracting image feature points one by one for all images, detecting its position and calculating its feature vector, and saving the feature point information of each image as a file for use in subsequent steps;

S2-3: reconstructing sparse three-dimensional point cloud: carrying out inter-image feature matching on the feature point information obtained in step S2-2, first calculating the camera position of each image, then carrying out selective inter-image matching according to the camera position, eliminating the mismatching after the inter-image feature point matching, then calculating the basic matrix and essential matrix by using the constraint on epipolar geometry in double views, then performing singular value decomposition on the essential matrix to obtain the information of image rotation and translation, then restoring the three-dimensional coordinates of feature points by triangulation technology, then optimizing all feature points and image rotation and translation by bundling optimization, and finally obtaining the sparse three-dimensional point cloud model of the scene;

S2-4: reconstructing dense three-dimensional point cloud: carrying out dense reconstruction on the sparse point cloud obtained in step S2-3, expanding the sparse point cloud to all pixel points of the image so that there will be epipolar geometric constraints on the same part in multiple view images, on the premise of epipolar geometry constraints, searching for and judging pixel by pixel on the epipolar lines in the corresponding images, finding corresponding points, searching for corresponding points in all images, and then expanding and reconstructing dense three-dimensional point cloud;

S2-5: optimizing a point cloud model: optimizing the point cloud model on the dense point cloud obtained in step S2-4, first deleting the miscellaneous points in the model, and then reconstructing its surface to improve the model;

S2-6: reconstructing a three-dimensional navigation map: constructing a three-dimensional navigation map based on the optimized model obtained in step S2-5, inputting a point cloud model, then taking the whole space as a root node, dividing the space down continuously until reaching the required resolution; for the leaf space with some points, defining its value as 1, indicating that it is occupied; and for the leaf space without points, defining its value as 0, indicating that it is empty, and finally obtaining a three-dimensional navigation map.

The above technical features have the functions of collecting image data sets of scenes from different positions and angles, then extracting image feature points one by one for all images in the process of extracting feature points, detecting the position of each feature point and calculating its feature vector, saving the feature point information of each image into a file, and in addition, carrying out inter-image feature matching on the obtained feature point information, first calculating the camera position of each image, then carrying out selective inter-image matching according to the camera position, eliminating the mismatching after the inter-image feature point matching, then calculating the basic matrix and essential matrix by using the constraint on epipolar geometry in double views, then performing singular value decomposition on the essential matrix to obtain the information of image rotation and translation, then restoring the three-dimensional coordinates of feature points by triangulation technology, then optimizing all feature points and image rotation and translation by bundling optimization, finally obtaining the sparse three-dimensional point cloud model of the optimized scene, optimizing by the point cloud model, and finally obtaining a clear three-dimensional navigation map, so as to achieve higher accuracy and higher precision of the finally constructed navigation map.

As shown in FIG. 3, preferably, the method of carrying out selective inter-image matching in step S2-3 is as follows: first selecting a first image to be initialized as (0,0,0), then calculating the camera position for the subsequent images from the reference image, and in the process of matching between reconstructed images, for each image, taking the distance between the images with the nearest distance as the unit radius R, and setting a scale coefficient K to match only other images whose distance from this image is less than KR. The function of this technical feature is to make the matching effect better and closer to reality in the process of image matching, and finally ensure high accuracy.

Preferably, the step of calculating the camera position corresponding to the image is as follows:

i) extracting feature points from all images, selecting the first image as a reference image, and initializing it as (0,0,0);

ii) starting from the reference image, carrying out the feature point matching between the following image and the current image, calculating the camera position parameters, i.e. the rotation matrix and the translation vector, according to the constraint on epipolar geometry in double views; giving a matrix F, which represents the basic matrix of the relationship between two image cameras, in which given two matching points $x_1$ and $x_2$, the two matching points have the relationship as shown in the following formula (1);

$$x_1^T F x_2 \quad (1);$$

where: T represents the transposition of a vector, and the degree of freedom of matrix F is 7, so that matrix F is calculated by an eight-point method;

then calculating a given matrix E, which represents the essential matrix of the relationship between two image cameras, in which the essential matrix can be obtained as shown in the following formula (2);

$$F = k'^{-T} E k^{-1} \quad (2);$$

where K and K' are the internal parameter matrices of two cameras, respectively, the essential matrix E consists of a rotation matrix R and a translation vector t, and as shown in the following formula (3), E can be subjected to singular value decomposition to obtain R and t;

$$E = t^\wedge R \quad (3);$$

iii) taking the subsequent image as the current image, and repeating step ii until all the image camera positions are obtained.

According to the method, feature points are acquired for all acquired images, so that the authenticity of the finally acquired images is higher, and the accuracy of the final images is further ensured.

Preferably, when each image is matched with other images, an image closest to the camera position of the image is found, and during the inter-image matching when the distance therebetween is set as the unit radius R, a scale coefficient K is given, only other images whose camera position satisfies formula (4) are matched:

$$H_{ij} < KR \quad (4);$$

where $H_{ij}$ represents the camera position distance between the ith image and the jth image, which can reduce many unnecessary inter-image matching and reduce time consumption.

The above method can reduce many unnecessary inter-image matching, finally improve the matching degree, and finally reduce many unnecessary inter-image matching and time consumption.

Preferably, the three-dimensional navigation map in step S2-6 is based on an octree data structure, which refers to a tree data structure with eight sub-nodes, the space is divided into eight sub-spaces after being divided for three times, that is to say, left and right, up and down, front and back, the original three-dimensional point cloud model space is divided into octrees, the space without point cloud is not divided, and all the nodes of the leaf nodes with point cloud are pruned, finally, the three-dimensional navigation map with octree as the storage structure is obtained, the resolution is adjustable, and finally, the process of constructing a three-dimensional point cloud model into a three-dimensional navigation map is realized. The above method can obtain image information from different spaces and angles to improve the accuracy of image construction.

Figure 5:
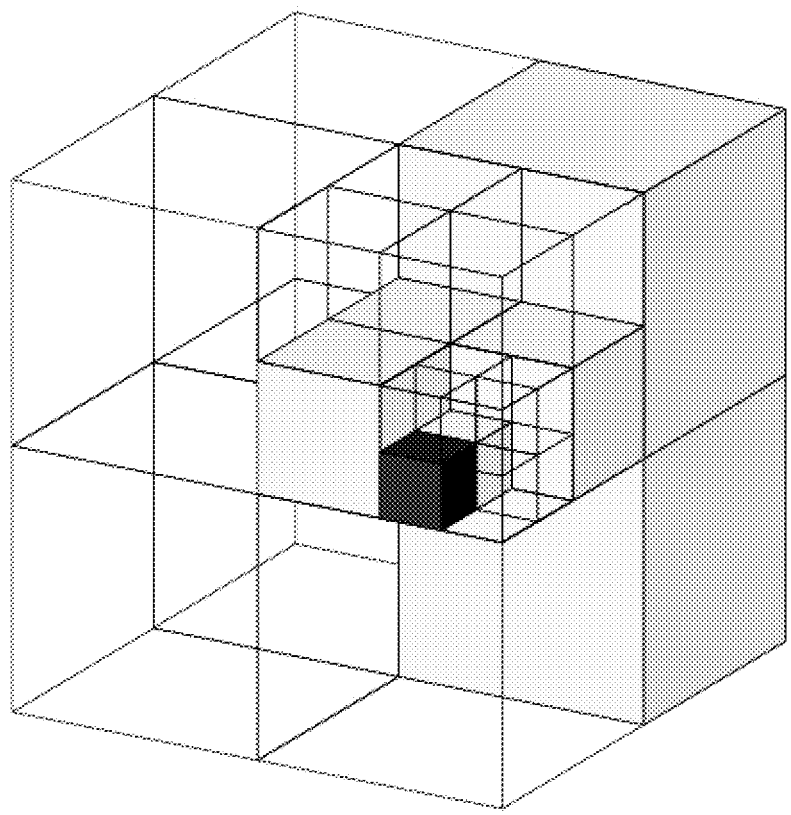
FIG. 5 is a schematic diagram of octree space division.

Specifically, the three-dimensional navigation map is based on an octree data structure:

Octree refers to a tree data structure with eight sub-nodes. The space is divided into eight sub-spaces after being divided for three times, that is to say, left and right, up and down, front and back. Therefore, octree is put forward according to this idea. The original three-dimensional point cloud model space is divided into octrees, and the space is continuously and recursively divided into smaller subspaces until it is divided into satisfactory resolutions. The resolution indicates the size of the smallest subspace. For example, the resolution is 0.01 m, which means that the leaf size of the tree is 1 cm. The space without point cloud is not divided, and all the nodes of the leaf nodes with point cloud are pruned, which saves the storage space to the maximum extent. Finally, the three-dimensional navigation map with octree as the storage structure is obtained. In actual navigation, the value of each leaf space is queried to know whether it can pass, and the resolution can be adjusted according to different environmental requirements. Refer to FIG. 5 for the schematic diagram of octree space division.

Figure 6:
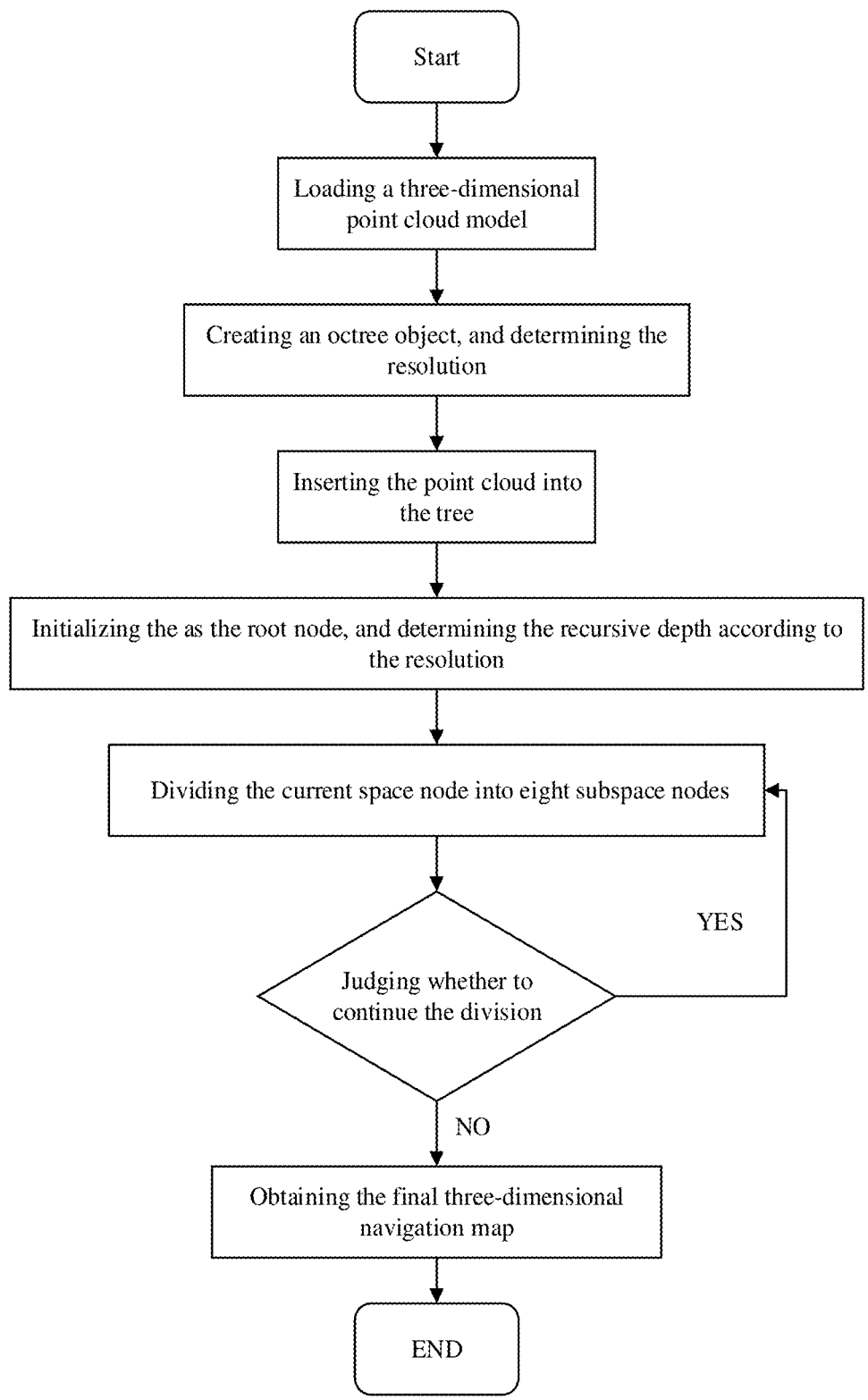
FIG. 6 is a flow chart of constructing a three-dimensional navigation map from a three-dimensional point cloud model.

Preferably, the overall process of constructing a three-dimensional point cloud model as a three-dimensional navigation map is shown in FIG. 6. The step of constructing a three-dimensional point cloud model as a three-dimensional navigation map is as follows:

a) loading a three-dimensional point cloud model, determining the resolution of a three-dimensional navigation map, creating an octree object, and inserting the point cloud into the tree;

b) initializing the point cloud space as the root node, and determining the recursive depth according to the resolution;

c) dividing the current space node into eight subspace nodes, and not dividing if there is no point cloud in the current space;

d) judging whether to continue the division, if not, continuing the previous step c, if so, stopping the division, pruning all the nodes of the leaf nodes with point cloud, and obtaining the final three-dimensional navigation map.

The above method further shows how to construct a three-dimensional navigation map by using the three-dimensional point cloud model, and the whole process is simple and convenient to operate.

Figure 7:
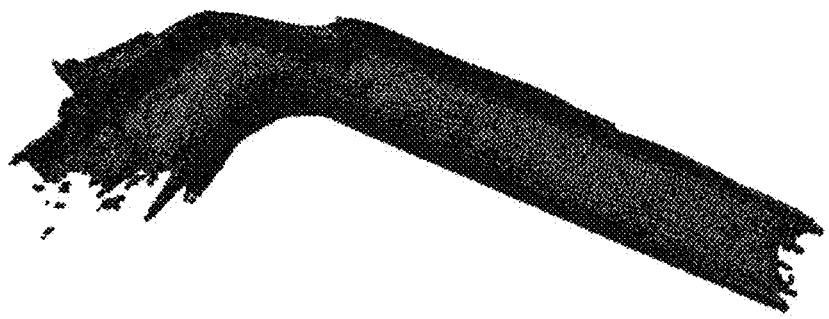
FIG. 7 is an effect diagram of a reconstructed three-dimensional navigation map of a scene.

Working principle: the scene image set is acquired by an unmanned aerial vehicle 1 loaded with a data acquiring component 2, then the scene image set is input into the three-dimensional navigation map construction system, and the three-dimensional navigation map of the scene is output to provide auxiliary information for the navigation of an unmanned aerial vehicle 1. The three-dimensional navigation map construction system consists of the flow steps of image set input, feature point extraction, sparse three-dimensional point cloud reconstruction, dense three-dimensional point cloud reconstruction, point cloud model optimization and three-dimensional navigation map reconstruction. Through these flow steps of the three-dimensional navigation map construction system, the acquired scene image set can obtain the three-dimensional navigation map of the scene. The image set input step is to load the scene image data set into a three-dimensional navigation map construction system, open the folder where the image data set is located in the three-dimensional navigation map construction system, and then load all images. The feature point extraction step is to detect the feature points of each image and save the results. The sparse three-dimensional point cloud reconstruction step can reconstruct the sparse three-dimensional point cloud model of the scene, use the saved results in the previous step for selective inter-image matching, and obtain the sparse point cloud through triangulation and bundling optimization. The dense three-dimensional point cloud reconstruction step can reconstruct the dense three-dimensional point cloud model of the scene, and expand the point cloud with the results of the previous step to obtain the dense model. The point cloud model optimization step is to remove the miscellaneous point and reconstruct the surface of the model, so as to obtain an improved model. The three-dimensional navigation map reconstruction step can reconstruct the three-dimensional navigation map of the scene, and use the optimized model in the previous step to construct and obtain the three-dimensional navigation map with octree as data structure. The resulting three-dimensional navigation map has high accuracy, small memory occupation and adjustable resolution, which can be used for navigation of an unmanned aerial vehicle 1 conveniently and provide auxiliary information. Refer to FIG. 7 for the reconstructed three-dimensional navigation map of the scene.

Finally, it should be noted that the above embodiments are only used to illustrate the technical scheme of the present disclosure, rather than limit the technical scheme. Although the present disclosure has been described in detail with reference to the preferred embodiments, those skilled in the art should understand that the technical scheme of the present disclosure can be modified or equivalently replaced without departing from the purpose and scope of the technical scheme of the present disclosure, which should be covered by the claims of the present disclosure.

What is claimed is:

1. An unmanned aerial vehicle navigation map construction method based on three-dimensional image reconstruction technology, comprising the steps of:
   (S1) constructing a three-dimensional navigation map for a scene image set acquired by a data acquiring component; and
   (S2) inputting the acquired scene image set into a three-dimensional navigation map construction system, sequentially carrying out feature point extraction, sparse three-dimensional point cloud reconstruction, dense three-dimensional point cloud reconstruction, point cloud model optimization, and three-dimensional navigation map reconstruction in the three-dimensional navigation map construction system, and finally obtaining a three-dimensional navigation map of a scene as a navigation map of the unmanned aerial vehicle for providing auxiliary information,
   wherein the constructing the three-dimensional navigation map in the step S1 comprises using the unmanned aerial vehicle loaded with the data acquiring component to carry out aerial photography of a target scene, and collecting an image data set of the target scene from different positions and angles, and
   wherein the inputting the acquired scene image set in the step S2 comprises:
   (S2-1) inputting the acquired scene image set into the three-dimensional navigation map construction system, opening a folder where the scene image set is located in the three-dimensional navigation map construction system, and then selecting and loading all images;
   (S2-2) extracting image feature points one by one for all images, detecting a respective position and calculating a respective feature vector, and saving feature point information of each image as a file for use in subsequent steps;
   (S2-3) carrying out inter-image feature matching on the feature point information obtained in the step S2-2, first calculating a camera position of each image, carrying out selective inter-image matching according to the camera position, eliminating mismatching after the inter-image feature point matching, calculating a basic matrix and an essential matrix by using a constraint on epipolar geometry in double views, performing singular value decomposition on the essential matrix to obtain information of image rotation and translation, restoring three-dimensional coordinates of feature points by triangulation technology, optimizing all feature points and image rotation and translation by bundling optimization, and finally obtaining a sparse three-dimensional point cloud model of the scene;
   (S2-4) carrying out dense reconstruction on a sparse point cloud obtained in the step S2-3, expanding the sparse point cloud to all pixel points of an image so that there are epipolar geometric constraints on a same part in multiple view images, on a premise of epipolar geometry constraints, searching for and judging pixel by pixel on epipolar lines in corresponding images, finding corresponding points, searching for corresponding points in all images, and then expanding and reconstructing a dense three-dimensional point cloud;
   (S2-5) optimizing the point cloud model on the dense point cloud obtained in the step S2-4, first deleting miscellaneous points in the model, and then reconstructing its surface to improve the model; and
   (S2-6) constructing a three-dimensional navigation map based on the optimized model obtained in step the S2-5, inputting the point cloud model, then taking the whole space as a root node, dividing the space down continuously until reaching a required resolution for a leaf space with some points, defining its value as 1, indicating that it is occupied, and for the leaf space without points, defining its value as 0, indicating that it is empty, and finally obtaining a three-dimensional navigation map.

2. The unmanned aerial vehicle navigation map construction method based on three-dimensional image reconstruction technology according to claim 1, wherein the step of carrying out the inter-image feature matching in the step S2-3 comprises: first selecting a first image to be initialized as (0,0,0), then calculating the camera position for subsequent images from a reference image, and in a process of matching between reconstructed images, for each image, taking a distance between the images with the nearest distance as a unit radius R, and setting a scale coefficient K to match only other images whose distance from this image is less than KR.

3. The unmanned aerial vehicle navigation map construction method based on three-dimensional image reconstruction technology according to claim 2, wherein the step of calculating the camera position corresponding to the image comprises:

i) extracting feature points from all images, selecting the first image as a reference image, and initializing it as (0,0,0);
ii) starting from the reference image, carrying out the feature point matching between a following image and a current image, calculating camera position parameters, including a rotation matrix and a translation vector, according to the constraint on epipolar geometry in double views; giving a matrix F, which represents the basic matrix of a relationship between two image cameras, in which two matching points $x_1$ and $x_2$ are given, the two matching points having a relationship defined in the following formula (1), $$x_1^T F x_2 \qquad (1),$$

where T represents a transposition of a vector, and a degree of freedom of matrix F is 7, so that the matrix F is calculated by an eight-point method, and
then calculating a given matrix E, which represents the essential matrix of the relationship between two image cameras, in which the essential matrix can be obtained from the following formula (2), $$F = k'^{-T} E k^{-1} \qquad (2),$$

where K and K' are internal parameter matrices of two cameras, respectively, the essential matrix E consists of a rotation matrix R and a translation vector t, and as defined in the following formula (3), E can be subjected to singular value decomposition to obtain R and t, $$E = t^\wedge R \qquad (3); \text{ and}$$

iii) taking the subsequent image as the current image, and repeating the step ii until all the image camera positions are obtained.

4. The unmanned aerial vehicle navigation map construction method based on three-dimensional image reconstruction technology according to claim 3, wherein the three-dimensional navigation map in the step S2-6 is based on an octree data structure, which refers to a tree data structure with eight sub-nodes, the space is divided into eight subspaces after being divided for three times, an original three-dimensional point cloud model space is divided into octrees, the space without point cloud is not divided, and all nodes of leaf nodes with point cloud are pruned, finally, the three-dimensional navigation map with octree as a storage structure is obtained, and the resolution is adjustable.

5. The unmanned aerial vehicle navigation map construction method based on three-dimensional image reconstruction technology according to claim 2, wherein when each image is matched with other images, an image closest to the camera position of the image is found, and during the inter-image matching when the distance therebetween is set as the unit radius R, the scale coefficient K is given, only other images whose camera position satisfies formula (4) are matched:

$$H_{ij} < KR \qquad (4);$$

where $H_{ij}$ represents the camera position distance between a ith image and a jth image.

6. The unmanned aerial vehicle navigation map construction method based on three-dimensional image reconstruction technology according to claim 5, wherein the three-dimensional navigation map in the step S2-6 is based on an octree data structure, which refers to a tree data structure with eight sub-nodes, the space is divided into eight subspaces after being divided for three times, an original three-dimensional point cloud model space is divided into octrees, the space without point cloud is not divided, and all nodes of leaf nodes with point cloud are pruned, finally, the three-dimensional navigation map with octree as a storage structure is obtained, the resolution is adjustable, and finally, the process of constructing a three-dimensional point cloud model into a three-dimensional navigation map is realized.

7. The unmanned aerial vehicle navigation map construction method based on three-dimensional image reconstruction technology according to claim 6, wherein the step of constructing the three-dimensional point cloud model comprises:

a) loading a three-dimensional point cloud model, determining the resolution of a three-dimensional navigation map, creating an octree object, and inserting the point cloud into the tree;
b) initializing the point cloud space as the root node, and determining a recursive depth according to the resolution;
c) dividing a current space node into eight subspace nodes, and not dividing if there is no point cloud in a current space; and
d) judging whether to continue the division, if not, continuing the previous step c, if so, stopping the division, pruning all the nodes of the leaf nodes with point cloud, and obtaining the final three-dimensional navigation map.

8. The unmanned aerial vehicle navigation map construction method based on three-dimensional image reconstruction technology according to claim 2, wherein the three-dimensional navigation map in the step S2-6 is based on an octree data structure, which refers to a tree data structure with eight sub-nodes, the space is divided into eight subspaces after being divided for three times, an original three-dimensional point cloud model space is divided into octrees, the space without point cloud is not divided, and all nodes of leaf nodes with point cloud are pruned, finally, the three-dimensional navigation map with octree as a storage structure is obtained, the resolution is adjustable, and finally, the process of constructing a three-dimensional point cloud model into a three-dimensional navigation map is realized.

9. The unmanned aerial vehicle navigation map construction method based on three-dimensional image reconstruction technology according to claim 8, wherein the step of constructing the three-dimensional point cloud model comprises:

a) loading a three-dimensional point cloud model, determining the resolution of a three-dimensional navigation map, creating an octree object, and inserting the point cloud into the tree;
b) initializing the point cloud space as the root node, and determining a recursive depth according to the resolution;
c) dividing a current space node into eight subspace nodes, and not dividing if there is no point cloud in a current space; and
d) judging whether to continue the division, if not, continuing the previous step c, if so, stopping the division, pruning all the nodes of the leaf nodes with point cloud, and obtaining the final three-dimensional navigation map.

10. The unmanned aerial vehicle navigation map construction method based on three-dimensional image reconstruction technology according to claim 1, wherein the step of calculating the camera position corresponding to the image comprises:

i) extracting feature points from all images, selecting a first image as a reference image, and initializing it as (0,0,0);

ii) starting from the reference image, carrying out the feature point matching between a following image and a current image, calculating camera position parameters, including a rotation matrix and a translation vector, according to the constraint on epipolar geometry in double views; giving a matrix F, which represents the basic matrix of a relationship between two image cameras, in which two matching points $x_1$ and $x_2$ are given, the two matching points having a relationship defined in the following formula (1), $$x_1^T F x_2 \tag{1}$$

where T represents a transposition of a vector, and a degree of freedom of matrix F is 7, so that the matrix F is calculated by an eight-point method, and then calculating a given matrix E, which represents the essential matrix of the relationship between two image cameras, in which the essential matrix can be obtained from the following formula (2), $$F = k'^{-T} E k^{-1} \tag{2}$$

where K and K' are internal parameter matrices of two cameras, respectively, the essential matrix E consists of a rotation matrix R and a translation vector t, and as defined in the following formula (3), E can be subjected to singular value decomposition to obtain R and t, $$E = t^{\wedge} R \tag{3}; \text{ and}$$

iii) taking the subsequent image as the current image, and repeating the step ii until all the image camera positions are obtained.

11. The unmanned aerial vehicle navigation map construction method based on three-dimensional image reconstruction technology according to claim 10, wherein the three-dimensional navigation map in the step S2-6 is based on an octree data structure, which refers to a tree data structure with eight sub-nodes, the space is divided into eight sub-spaces after being divided for three times, an original three-dimensional point cloud model space is divided into octrees, the space without point cloud is not divided, and all nodes of leaf nodes with point cloud are pruned, finally, the three-dimensional navigation map with octree as a storage structure is obtained, and the resolution is adjustable.

12. The unmanned aerial vehicle navigation map construction method based on three-dimensional image reconstruction technology according to claim 1, wherein the three-dimensional navigation map in the step S2-6 is based on an octree data structure, which refers to a tree data structure with eight sub-nodes, the space is divided into eight sub-spaces after being divided for three times, an original three-dimensional point cloud model space is divided into octrees, the space without point cloud is not divided, and all nodes of leaf nodes with point cloud are pruned, finally, the three-dimensional navigation map with octree as a storage structure is obtained, the resolution is adjustable, and finally, the process of constructing a three-dimensional point cloud model into a three-dimensional navigation map is realized.

13. The unmanned aerial vehicle navigation map construction method based on three-dimensional image reconstruction technology according to claim 12, wherein the step of constructing the three-dimensional point cloud model comprises:

a) loading a three-dimensional point cloud model, determining the resolution of a three-dimensional navigation map, creating an octree object, and inserting the point cloud into the tree;

b) initializing the point cloud space as the root node, and determining a recursive depth according to the resolution;

c) dividing a current space node into eight subspace nodes, and not dividing if there is no point cloud in a current space; and d) judging whether to continue the division, if not, continuing the previous step c, if so, stopping the division, pruning all the nodes of the leaf nodes with point cloud, and obtaining the final three-dimensional navigation map.

* * * * *